Aug. 2, 1932.

G. F. DUGGER 1,870,105

CULTIVATOR SHOVEL

Filed Dec. 7, 1929

WITNESS

INVENTOR
G. F. Dugger,
BY
ATTORNEY

Patented Aug. 2, 1932

1,870,105

UNITED STATES PATENT OFFICE

GEORGE F. DUGGER, OF ALLEN, TEXAS, ASSIGNOR OF ONE-HALF TO JAMES GARLAND, OF ALLEN, TEXAS

CULTIVATOR SHOVEL

Application filed December 7, 1929. Serial No. 412,388.

My invention relates to cultivator shovels or cotton sweeps and an object of the same is to improve the device set forth in my co-pending application Serial Number 266,273, filed March 31, 1928.

In the device disclosed in the co-pending application the extension or spoon is connected with the upper face of one of the wings of the cotton sweep forwardly of the rear terminal of the wing. The present invention contemplates casting the cotton sweep wing and extension as a unitary structure and to locate the extension at the same inclination as that of the wing with the upper edge of the extension arising a considerable distance above the wing.

Figure 1:
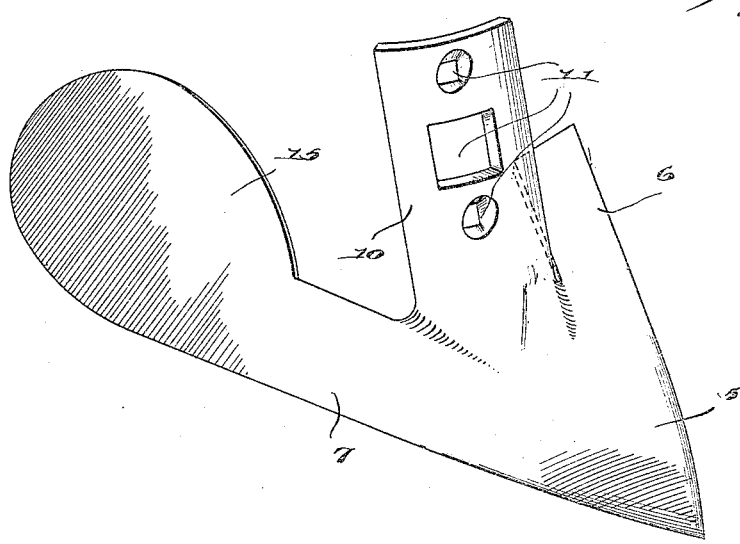
Figure 2:
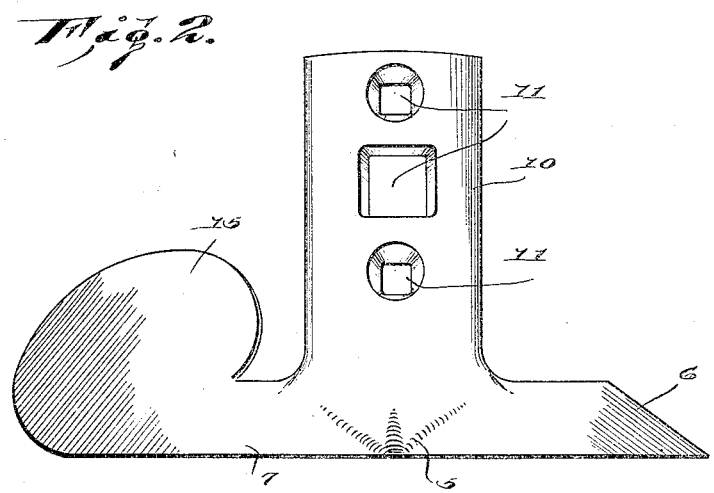

With the preceding and other objects and advantages in mind, the invention consists in the novel combination of elements, constructions and arrangements of parts and operations to be hereinafter more fully described, claimed and illustrated in the accompanying drawing, wherein:

Figure 1 is a perspective of a cultivator shovel or cotton sweep embodying my improvement; and Fig. 2 is a front elevation of the same.

Referring to the invention in detail a conventional cotton sweep or cultivator shovel 5 having divergent wings 6 and 7 which are located at an oblique angle with respect to the horizontal, is provided. An upstanding attaching shank 10 is formed with the shovel or cotton sweep at its rear and is formed with suitable openings 11 for the reception of fastenings to secure the attaching shank to a cultivator standard, not shown.

The rear end of the wing 7 terminates in a rounded, rearwardly extending extension or auxiliary mold board 15 of a relatively great area. As illustrated in the drawing the auxiliary mold board or extension is disposed in the same plane as the wing 7 and arises a considerable distance above the upper edge of this wing 7. Also the lower edge of the extension is contiguous with the lower edge of the wing 7 so that a substantial portion of the lower edge of the extension will lie upon the ground. It will therefore be seen that as the shovel is drawn forwardly to loosen the earth the auxiliary mold board will operate to turn uprooted grass and other undesirable vegetation so that the same will not continue to grow.

What is claimed is:

A cotton sweep including a ground engaging point, diverging wings formed with said point and extending rearwardly therefrom at oblique angles with respect to the horizontal, and an upstanding shank formed with said point and between said diverging wings, one of said wings being formed with a rearwardly extending rounded mold board of relatively great area, said mold board being disposed in substantially the same plane as said wing and arising a considerable distance above the upper edge of said wing, the lower edge of said extension being formed as a continuation of the lower edge of said wing so that a substantial portion of the lower edge of the extension will contact with the ground so that as the sweep is drawn forward to loosen the earth the mold board will direct the severed material toward the plant row.

GEORGE F. DUGGER.